United States Patent
Akahane

(10) Patent No.: US 8,773,100 B2
(45) Date of Patent: Jul. 8, 2014

(54) INDUCTIVE LOAD CONTROLLING DEVICE

(75) Inventor: Masashi Akahane, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 118 days.

(21) Appl. No.: 13/612,700

(22) Filed: Sep. 12, 2012

(65) Prior Publication Data

US 2013/0093402 A1   Apr. 18, 2013

(30) Foreign Application Priority Data

Oct. 13, 2011   (JP) ................. 2011-225916

(51) Int. Cl.
*G05F 1/40*   (2006.01)

(52) U.S. Cl.
USPC ........................................ 323/284

(58) Field of Classification Search
USPC .......... 323/234, 275, 282–285; 327/108, 110; 307/10.1
See application file for complete search history.

(56) References Cited

U.S. PATENT DOCUMENTS

| | | | | |
|---|---|---|---|---|
| 4,950,974 A * | 8/1990 | Pagano | ........................ | 323/222 |
| 5,670,864 A * | 9/1997 | Marx et al. | .................... | 323/211 |
| 6,687,555 B1 * | 2/2004 | Honda et al. | .................... | 700/73 |
| 6,965,222 B2 * | 11/2005 | Yokoyama et al. | ........... | 323/284 |
| 7,067,941 B2 * | 6/2006 | Honda et al. | ................... | 307/412 |
| 7,504,743 B2 * | 3/2009 | Matsumoto et al. | ......... | 307/10.1 |
| 7,592,792 B2 * | 9/2009 | Ryu et al. | ....................... | 323/284 |
| 7,795,930 B2 * | 9/2010 | Akahane et al. | .............. | 327/110 |
| 2012/0105042 A1* | 5/2012 | Naito et al. | .................... | 323/290 |

FOREIGN PATENT DOCUMENTS

| | | | |
|---|---|---|---|
| JP | 07077271 | A | 3/1995 |
| JP | 3205444 | B2 | 4/1995 |
| JP | 3622436 | B2 | 2/1999 |
| JP | 2010242806 | A | 10/2010 |

\* cited by examiner

*Primary Examiner* — Adolf Berhane

(74) *Attorney, Agent, or Firm* — Rabin & Berdo, P.C.

(57) ABSTRACT

An inductive load controlling device in which a target current value is reached in a short time while suppressing overshoot, undershoot, and ringing, including a target value filter that receives a target current value of electric current to be supplied to the load and exhibits differential characteristics using a plurality of filter parameters; an inductive load controlling section that controls load current to be supplied to the load based on a filter output from the target value filter; a parameter memory section that stores parameters for the filter corresponding to a plurality of selection conditions; a selection condition detecting section that detects the selection conditions; and a parameter selection processing section that selects the filter parameters fitting to the selection condition out of the parameter memory section based on the selection condition detected by the selection condition detecting section and delivers the filter parameters to the filter.

17 Claims, 13 Drawing Sheets

FIG. 4

| SELECTION CONDITION | | | PARAMETER | | | | |
|---|---|---|---|---|---|---|---|
| fpwm | Vbat | RL | C0 | C1 | F0 | F1 | F2 |
| 50Hz | 9V | 4Ω | 0.50 | −0.20 | 0.37 | 5.6 | 0.62 |
| | | 5Ω | 0.60 | −0.30 | 0.38 | 5.7 | 0.63 |
| | | ⋮ | ⋮ | ⋮ | ⋮ | ⋮ | ⋮ |
| | 10V | 4Ω | 0.49 | −0.19 | 0.28 | 4.6 | 0.48 |
| | | 5Ω | 0.48 | −0.18 | 0.29 | 4.7 | 0.49 |
| | | ⋮ | ⋮ | ⋮ | ⋮ | ⋮ | ⋮ |
| | ⋮ | ⋮ | ⋮ | ⋮ | ⋮ | ⋮ | ⋮ |
| 100Hz | 9V | 4Ω | 0.50 | −0.20 | 0.37 | 5.6 | 0.62 |
| | | 5Ω | 0.60 | −0.30 | 0.38 | 5.7 | 0.63 |
| | | ⋮ | ⋮ | ⋮ | ⋮ | ⋮ | ⋮ |
| | 10V | 4Ω | 0.49 | −0.19 | 0.28 | 4.6 | 0.48 |
| | | 5Ω | 0.48 | −0.18 | 0.29 | 4.7 | 0.49 |
| | | ⋮ | ⋮ | ⋮ | ⋮ | ⋮ | ⋮ |
| | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

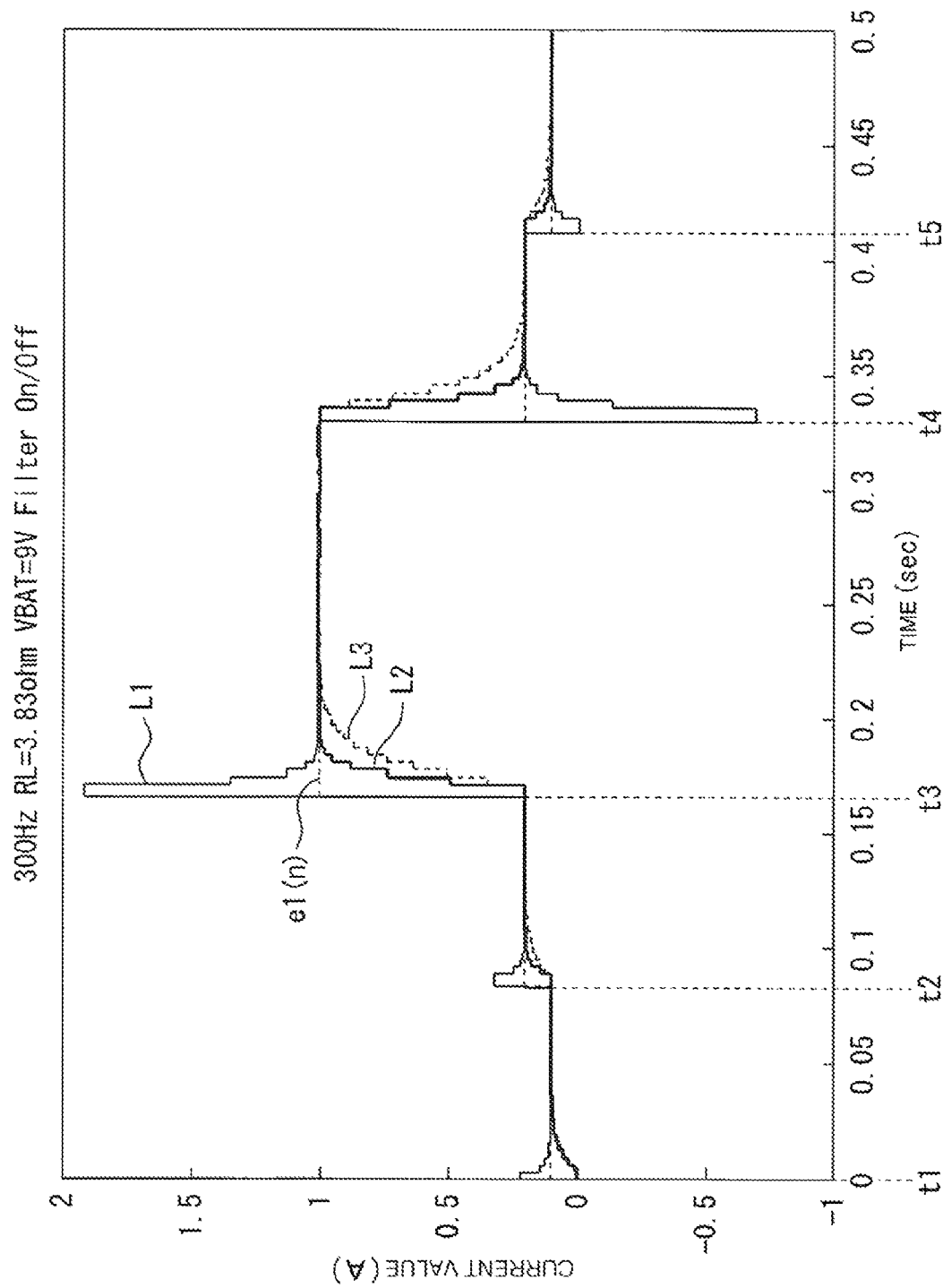

INDUCTIVE LOAD CONTROLLING DEVICE

CROSS-REFERENCE TO RELATED APPLICATION

This application is based on, and claims priority to, Japanese Patent Application No. 2011-225916, filed on Oct. 13, 2011, contents of which are incorporated herein by reference.

BACKGROUND OF THE INVENTION

1. Field of the Invention

The present invention relates to an inductive load controlling device used in a linear solenoid actuator that can be applied to automatic transmission for vehicles.

2. Description of the Related Art

One of conventional electric current control methods for the current in a linear solenoid that is used for an automatic transmission for vehicles controls the current in an inductive load by pulse width modulation (PWM) control.

FIG. 10 is a block diagram showing an example of outline structure of a closed loop control system to be applied to a conventional inductive load driving controller.

As shown in FIG. 10, to an end of an inductive load 105, which can be a linear solenoid, a driving circuit 103 for driving the inductive load 105 is connected and to the other end of the inductive load 105, a current detecting resistance 107 is connected in series. At the preceding stage of the driving circuit 103, a drive controlling circuit 102 is connected to perform PWM control in an analogue process. At the preceding stage of the drive controlling circuit 102, a D/A converter 101 is connected.

An average current detecting circuit 104 is connected to the both ends of the current detecting resistance 107 to detect an average value of electric current through the inductive load 105. The output terminal of the average current detecting circuit 104 is connected to the drive controlling circuit 102.

Current value controlling information FC indicating target current value through the inductive load 105 is converted to an analogue data in the D/A converter 101, and then delivered to the drive controlling circuit 102. Current If running in the inductance L of the inductive load 105 flows through the current detecting resistance 107. The average current detecting circuit 104 detects the average value Iavr of a load current If through the inductive load 105 and delivers the Iavr to the drive controlling circuit 102.

The drive control circuit 102 generates a PWM signal so that the average value Iavr of the current If through the inductive load 105 equals the target value indicated by the current value controlling information FC, and thus PWM controls the current If flowing through the inductive load 105 by ON/OFF controlling switching elements in the driving circuit 103.

FIG. 11 is a block diagram of another example of schematic construction of a closed loop control system to which a conventional inductive load drive controlling device is applied.

As shown in FIG. 11, to an end of an inductive load 105, a driving circuit 103 is connected and to the other end of the inductive load 105, a current detecting resistance 107 is connected in series. At the preceding stage of the driving circuit 103, a drive controlling circuit 112 is connected to perform PWM control in a digital process.

An average current detecting circuit 114 is connected to the both ends of the current detecting resistance 107, and the output terminal of the average current detecting circuit 114 is connected to the drive controlling circuit 112 through an ND converter 111.

The drive controlling circuit 112 receives a current value controlling information FC indicating a target value of current flowing in the inductive load 105. Electric current If running in inductance L of the inductive load 105 flows through the current detecting resistance 107, and an average value Iavr of the current If running in the inductive load 105 is detected by the average current detecting circuit 114. The average value Iavr is converted to a digital data in the A/D converter 111 and then delivered to the drive controlling circuit 112.

The drive controlling circuit 112 generates a PWM signal to perform PID control so that the average value Iavr of the load current If running in the inductive load 105 is equal to the target value indicated by the current value controlling information FC, and thus PWM-controls the current If running through the inductive load 105 by ON/OFF-controlling switching elements in the driving circuit 103.

FIG. 12 is a timing chart showing schematically the waveform of the current If through the inductive load 105 in the process of PWM-control by a conventional inductive load drive controlling device.

As shown in FIG. 12, the current If through the inductive load 105 increases during the PWM signal is at a high level and decreases during the PWM signal is at a low level. The current If is so controlled that the average value Iavr of the current If equals the target value indicated by the current value controlling information FC.

The state of the PWM signal (a high level or low level) depends on the function of the switching elements used in the driving circuit 103. In the example described above, the switching elements are assumed to turns on at a high level of the PWM signal and turns OFF at a low level of the PWM signal.

FIG. 13 is a block diagram of an example of construction of a hydraulic transmission device for vehicles in which a conventional inductive load controlling device is installed.

As shown in FIG. 13, whole the transmission device is controlled by an electronic control unit 122 that includes drive controlling devices each comprising a driving and controlling circuit 124 for directly controlling a linear solenoid 121, in turn driving a hydraulic pressure control device 120 and a microcomputer 123 for controlling the driving and controlling circuits 124.

Japanese Unexamined Patent Application Publication No. 2010-242806 discloses a linear solenoid module that comprises; an interface circuit for receiving a current command value for a solenoid actuator, a characteristic parameter memory element for storing correction characteristic parameters to obtain a uniform characteristic in the solenoid actuator, pulse width modulation (PWM) control circuit, a driving circuit, a current detecting resistance for detecting the load current in the solenoid actuator, and a linear solenoid controlling circuit having an average current detecting circuit and a temperature sensor.

Japanese Patent No. 3622436 discloses a solenoid controlling device for controlling a hydraulic pressure control circuit having a solenoid of a vehicle behavior controlling device. The solenoid control device comprises a relaxation processing means for relaxing a target current value corresponding to a status of the vehicle and an electric signal setting means for setting an electric signal to control the solenoid based on the deviation of the current actually flowing in the solenoid from the target current value that has been subjected to the relaxation processing.

Japanese Patent No. 3205444 discloses a solenoid driving device of an automatic transmission, the solenoid driving device having a means for detecting an oil temperature of the automatic transmission and a predetermined map, and controlling a rising characteristic of the solenoid based on both the actual oil temperature of the automatic transmission and the oil temperature inside the solenoid.

Japanese Unexamined Patent Application Publication No. H07-077271 discloses a hydraulic pressure control device of an automatic transmission comprising: a means for making a control parameter overshoot temporarily beyond a target command value when the target value to the solenoid is changed and then making the parameter return to the target command value, a means for detecting oil temperature, and a means for determining a degree of the overshooting corresponding to the detected oil temperature.

In the conventional example of FIG. 13, to drive-control the linear solenoid installed in a hydraulic transmission for vehicles, whole the transmission device is controlled by an electronic control unit 122 that includes drive controlling devices each comprising a driving circuit for directly controlling a linear solenoid and a drive controlling circuit for controlling this driving circuit. Since the linear solenoid installed in the transmission has a temperature dependent characteristic, it is necessary, in the process of developing a drive control device, to define a parameter for temperature correction in the control program in the microcomputer installed in the electronic control unit 122. The defined parameter needs to be adjusted in the process of manufacturing the transmission to set an optimum parameter for each transmission device.

Concerning this parameter setting, the conventional example disclosed in Japanese Unexamined Patent Application Publication No. 2010-242806 comprises, in the linear solenoid module, an information memory section for storing correction characteristic information to obtain a uniform characteristic and a control circuit for carrying out correction processing based on the correction characteristic information stored in the information memory section. Thus, characteristic correction processing can be performed in the linear solenoid module itself to simplify the parameter adjustment.

Automatic transmission for vehicles, however, needs to meet the demands: that overshoot, undershoot, or ringing does not occur with respect to the target current value, which is referred to as a requirement 1, and that fast responsiveness is necessary to reach the target current value in a short time, which is referred to as a requirement 2.

In the inductive load drive controlling device shown in FIG. 11, the requirement 2 can be met by conducting tuning of a differential control (D control) of the PID compensation control. On the other hand, the requirement 1 is hardly satisfied. Thus, the requirement 1 and the requirement 2 are in a trade-off relationship.

The conventional example disclosed in Japanese Patent No. 3622436 can satisfy the requirement 1 owing to a control device that is additionally provided with a filter for relaxation processing. However, optimum control for the requirement 2 cannot be performed because the relaxation processing essentially takes certain time to reach a target current value.

The conventional examples disclosed in Japanese Patent No. 3205444 and Japanese Unexamined Patent Application Publication No. H07-077271, which perform control with temporary overshoot with respect to the target current value, take into account the oil temperature of the automatic transmission and the oil temperature in the solenoid, and give an amount of overshooting by giving a fixed magnitude of current I and time T irrespective of the changed quantity in the target current value. Thus, optimum control for the requirement 2 cannot be performed.

SUMMARY OF THE INVENTION

Present invention has been accomplished in view of the unsolved problems described above, and an object of the present invention is to provide an inductive load controlling device that suppresses overshoot, undershoot, and ringing, and reaches the target current value in a short time.

To accomplish the object expressed above, the first aspect of the invention as stated in claim 1 provides an inductive load controlling device for controlling an inductive load, the inductive load controlling device comprising: a target value filter that receives a target current value of electric current to be supplied to the inductive load and exhibits differential characteristic using a plurality of filter parameters; an inductive load controlling section that controls load current to be supplied to the inductive load based on a filter output from the target value filter; a parameter memory section that stores filter parameters for the target value filter corresponding to a plurality of selection conditions; a selection condition detecting section that detects the selection conditions; and a parameter selection processing section that selects the filter parameters fitting to the selection condition out of the parameter memory section based on the selection condition detected by the selection condition detecting section and delivers the filter parameters to the target value filter.

The second aspect of the present invention provides an inductive load controlling device for controlling an inductive load, the inductive load controlling device comprising: a target value filter that receives a target current value of electric current to be supplied to the inductive load and exhibits differential characteristic using a plurality of filter parameters; an inductive load controlling section that comprises a current detecting section for detecting load current flowing in the inductive load and a PI (Proportional Integral) compensator for performing compensation processing using a plurality of compensation parameters to compensate a deviation of the load current detected by the current detecting section from a filter output from the target value filter, and controls load current to be supplied to the inductive load; a parameter memory section that stores the filter parameters for the target value filter and the compensation parameters for the PI compensator corresponding to a plurality of selection conditions; a selection condition detecting section that detects the selection conditions; and a parameter selection processing section that selects the filter parameters and the compensation parameters fitting to the selection condition out of the parameter memory section based on the selection condition detected by the selection condition detecting section and delivers the filter parameters and the compensation parameters to the target value filter and the PI compensator.

The third aspect of the present invention provides the inductive load controlling device, wherein the target value filter delivers a filter output y(n) represented by a formula:

$$y(n)=F0 \times y(n-1)+F1 \times (e1(n)-e1(n-1))+F2 \times e1(n)$$

where e1($n$) is a received target current value, e1(n−1) is a target current value at a previous sampling time, y(n−1) is a filter output value at the previous time, and F0, F1, and F2 are the filter parameters.

The fourth aspect of the present invention provides the inductive load controlling device, wherein the PI compensator delivers a compensation output d(n) represented by a formula:

$$d(n)=C0 \times e2(n)+C1 \times e2(n-1)+d(n-1)$$

where e2($n$) is a received deviation, e2(n−1) is a deviation at a previous sampling time, d(n−1) is a compensation output at the previous sampling time, and C0 and C1 are compensation parameters.

The fifth aspect of the present invention provides the inductive load controlling device, wherein the inductive load controlling device further comprises a target value change detecting section for detecting change of the target current value; the parameter memory section stores the filter parameters for the target value filter by separating the filter parameters to rising up parameters for rising up of the target current value and falling down parameters for falling down of the target current value; and the parameter selection processing section selects the falling down parameters when the target value change detecting section detects decrease of the target current value and selects the rising up parameters when the target value change detecting section detects increase of the target current value.

The sixth aspect of the present invention provides the inductive load controlling device, wherein the target value change detecting section defines decrease of a target value when a sign of result of subtracting the previous target current value e1(n−1) from the present target current value e1(n) is negative, and defines increase of a target value when a sign of result of subtracting the previous target current value e1(n−1) from the present target current value e1(n) is positive.

In the inductive load controlling device of the invention, a target current value is given to a target value filter exhibiting a differential characteristic using a plurality of filter parameters and the filter output of the target value filter is delivered to an inductive load controlling section to control the current to be supplied to the inductive load. Therefore, the inductive load controlling device of the invention can control an inductive load, such as a linear solenoid actuator, without overshoot, undershoot, and ringing owing to the differential characteristic of the target value filter and with fast responsiveness to reach the target current value in a short time.

In the inductive load controlling device of the invention, the filter parameters for the target value filter are stored in the parameter memory section corresponding to a plurality of selection conditions and the appropriate filter parameters are selected in the parameter selection processing section according to the selection conditions delivered from the selection condition detecting section and are delivered to the target value filter. As a result, the inductive load controlling device itself can perform parameter setting operation for the target value filter. Therefore, the inductive load controlling device installed in an automatic transmission simplifies parameter adjustment in the electronic control unit of the automatic transmission.

In addition, the-e inductive load controlling device installed in an automatic transmission shortens the time for optimization process of the control program in the electronic control unit and lightens the load for operational process of the electronic control unit.

BRIEF DESCRIPTION OF DRAWINGS

FIG. 4 shows an example of a parameter map that stores selection conditions and parameters corresponding to the selection conditions;

FIG. 7 shows response waveforms of average current in an inductive load in cases with and without a target value filter;

DETAILED DESCRIPTION OF THE INVENTION

Some preferred embodiments according to the present invention will be described in the following with reference to accompanied drawings.

Figure 1:
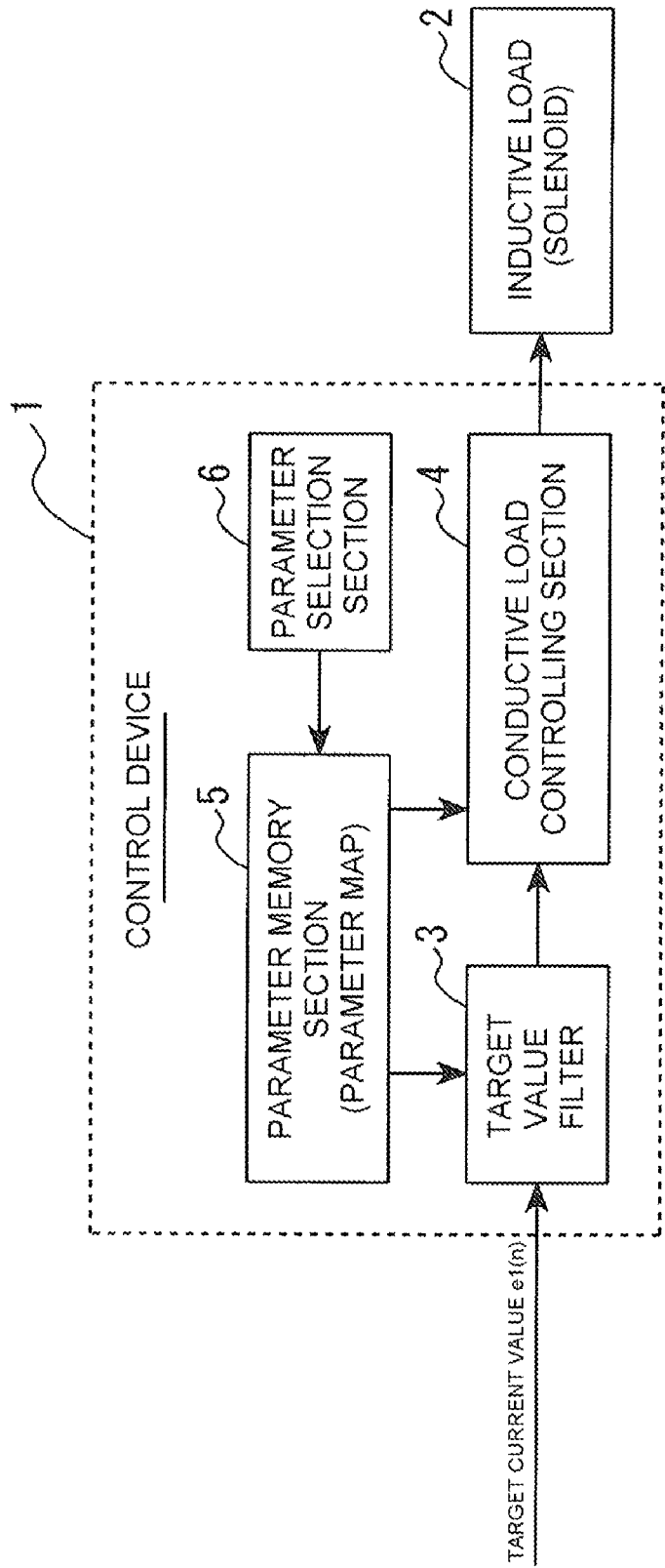
FIG. 1 is a block diagram showing a schematic construction of a first embodiment of an inductive load controlling device according to the present invention.

FIG. 1 is a block diagram of an inductive load controlling device of a first embodiment according to the present invention. The reference numeral 1 designates the inductive load controlling device for controlling an inductive load 2 such as a linear solenoid used in an automatic transmission.

The inductive load controlling device 1 comprises a target value filter 3 having a differential characteristic and receiving a target current value e1(n) from an external electronic control unit (ECU), and an inductive load controlling section 4 receiving a filter output from the target value filter 3.

The inductive load controlling device 1 also comprises a parameter memory section 5 and a parameter selection section 6. The parameter memory section 5 stores parameter map composed of various parameters for use in the target value filter 3 and the inductive load controlling section 4 as well as selection conditions for the parameters. The parameter selection section 6 selects the parameters stored in the parameter memory section 5 according to the selection condition and delivers the parameters to the target value filter 3 and the inductive load controlling section 4.

Figure 2:
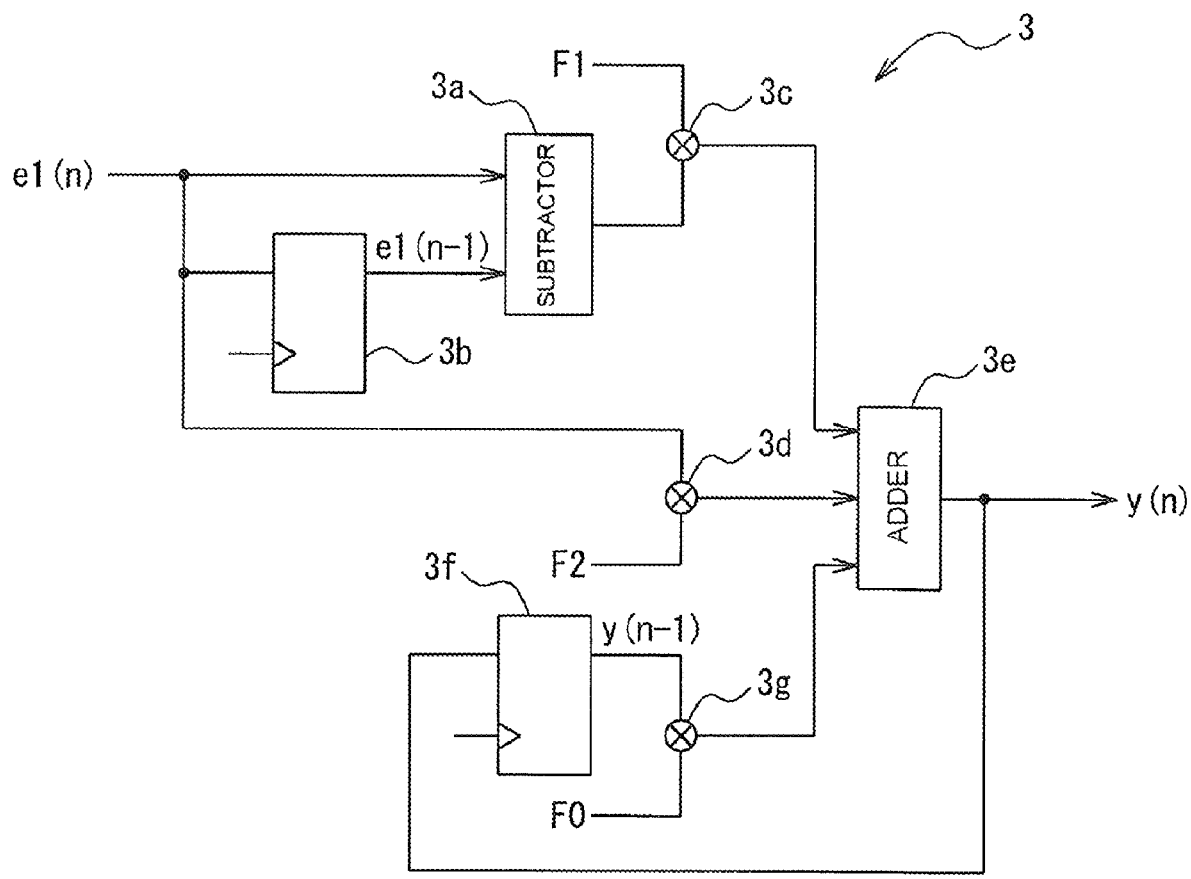
FIG. 2 is a block diagram showing a specific construction of a target value filter.

The target value filter 3 comprises, as shown in FIG. 2, a subtractor 3a, latching circuits 3b and 3f, multipliers 3c, 3d, and 3g, and an adder 3e. The subtractor 3a receives a target current value e1(n) directly at one input terminal. The latching circuit 3b holds a target current value e1(n−1) at the previous sampling time. The target current value e1(n−1) at the previous sampling time held in the latching circuit 3b is delivered to the other terminal of the subtractor 3a. The subtracted output from the subtractor 3a is delivered to a multiplier 3c that receives a filter parameter F1.

The multiplied output from the multiplier 3c is delivered to an adder 3e. The target current value e1(n) is also given to a multiplier 3d that receives a filter parameter F2. The multiplied output from the multiplier 3d is delivered to the adder 3e.

The filter output y (n) from the adder 3e is delivered to an external circuit, and at the same time, given to a latching circuit 3f and latched there as a filter output y (n−1) of a previous sampling time.

The filter output y (n−1) at the previous sampling time latched in the latching circuit 3f is given to a multiplier 3g that receives a filter parameter F0. The multiplied output from the multiplier 3g is delivered to the adder 3e. The filter output y (n) from the target value filter 3 can be represented by the equation (1) below.

$$y(n)=F0 \times y(n-1)+F1 \times (e1(n)-e1(n-1))+F2 \times e1(n) \qquad (1)$$

Figure 3:
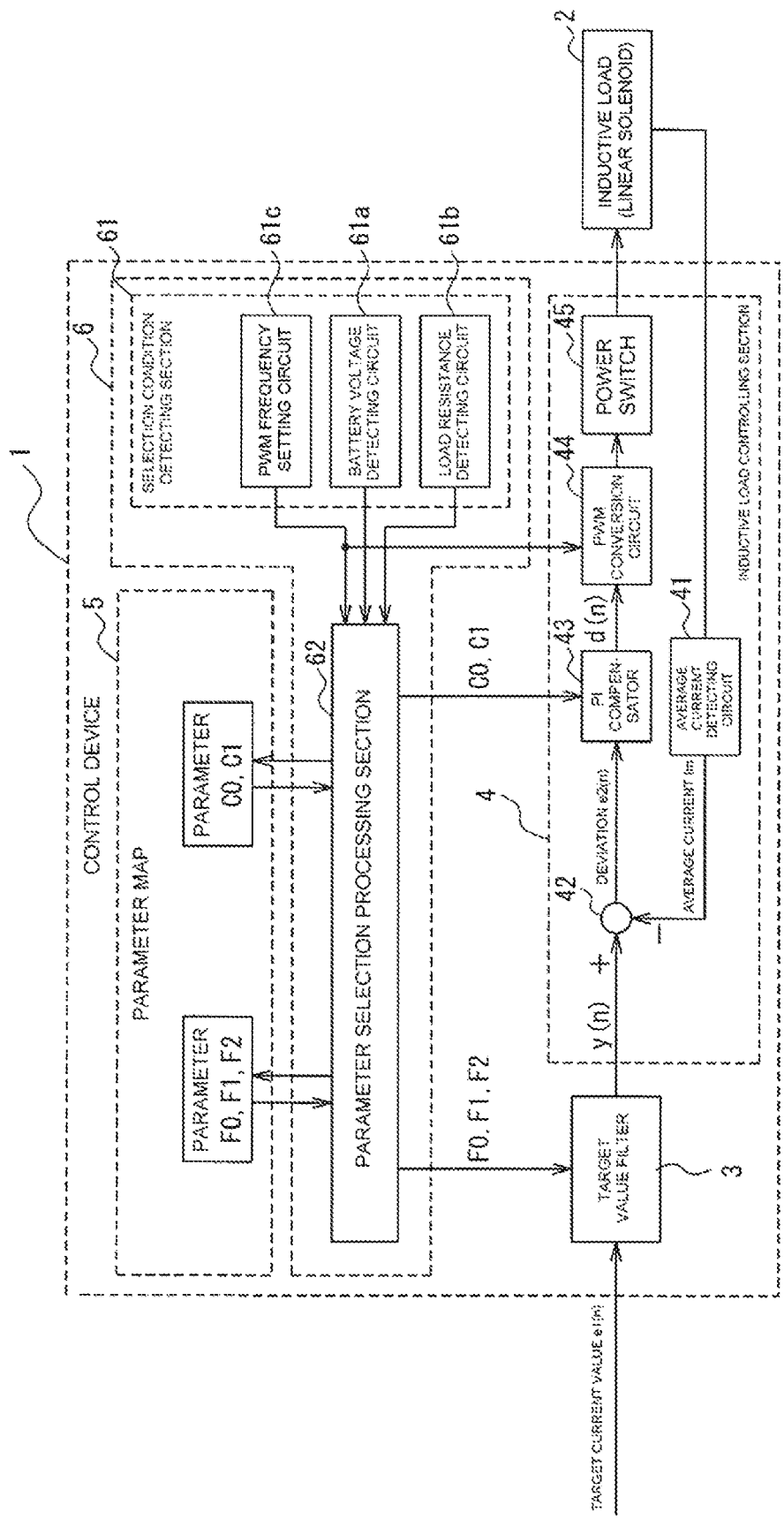
FIG. 3 is a block diagram showing a specific construction of the inductive load controlling device shown in FIG. 1.

The inductive load controlling section 4 has a construction shown in FIG. 3 and comprises: an average current detecting circuit 41 that detects an average current of load current flowing through the inductive load 2, a subtractor 42 that calculates a current deviation e2(n) of the average current Im delivered from the average current detecting circuit 41 from the filter output y(n) delivered from the target value filter 3, a PI compensator 43 that receives the current deviation e2(n) from the subtractor 42 and performs PI (proportional and integral) compensation processing, a PWM conversion circuit 44 that performs pulse width modulation (PWM) processing of a compensation output delivered from the PI compensator 43 and convert it into a pulse width modulation (PWM) signal, and a power switching circuit 45 that is a driving circuit to supply current to the inductive load 2 according to the PWM signal delivered from the PWM conversion circuit 44.

The PI compensator 43 performs proportional and integrating compensation processing on the given current deviation e2(n) and calculates a compensation output d(n) according to the following formula (2).

$$d(n)=C0 \times e2(n)+C1 \times e2(n-1)+d(n-1) \qquad (2)$$

where C0 and C1 are compensation parameters, e2(n−1) is a current deviation at the previous sampling time, and d(n−1) is a compensation output at the previous sampling time.

Figure 5:
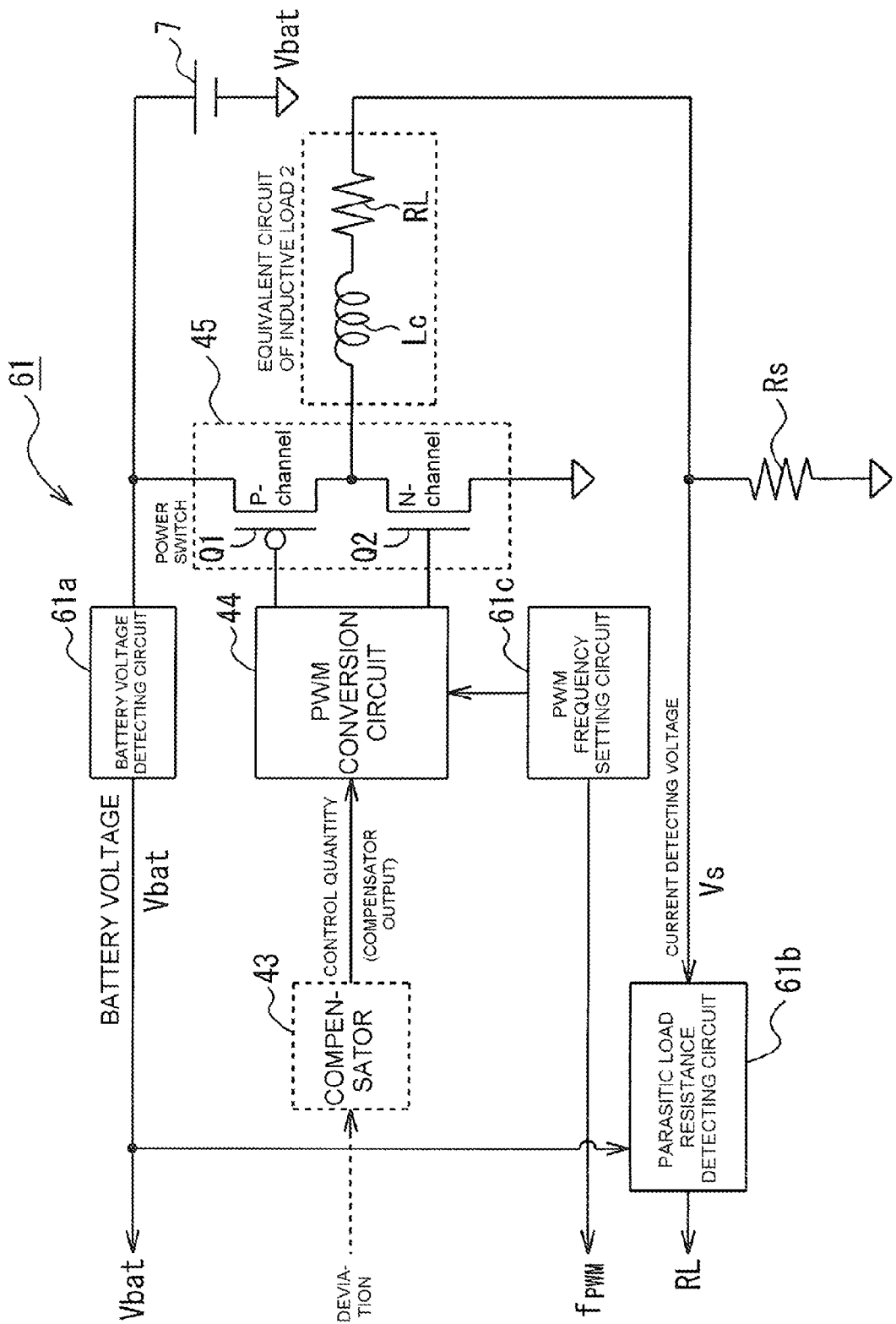
FIG. 5 is a block diagram illustrating a specific construction of a selection condition detecting section.

The power switching circuit 45 comprises a P-channel field effect transistor Q1 and an N-channel field effect transistor Q2 that are connected in series between an onboard battery 7 and the ground as shown in FIG. 5. To the connecting point between the drain of the P-channel field effect transistor Q1 and the drain of the N-channel field effect transistor Q2, an end of the inductive load 2 is connected, and the other end of the inductive load 2 is connected through a shunt resistance Rs for current detection to the ground.

The parameter memory section 5 indicated in FIG. 3 stores a parameter map as shown in FIG. 4. The parameter map contains selection conditions, filter parameters F0, F1 and F2, and compensation parameters C0 and C1 with correspondence among them.

In a non-limiting example, the selection conditions may be: the frequency fpwm of the PWM signal delivered from the PWM conversion circuit 44, the battery voltage Vbat of the battery 7 supplied to the power switching circuit 45, and a parasitic load resistance RL of the inductive load 2.

For each frequency fpwm of the PWM signal, a plurality of battery voltages Vbat are set, and for each battery voltage, a plurality of parasitic load resistances RL are set. Corresponding to each parasitic load resistance RL, filter parameters F0, F1 and F2, and compensation parameters C0 and C1 are set. The numerical values of the filter parameters F0, F1 and F2, and the compensation parameters C0 and C1 can be obtained by the first method that executes in advance numerical simulation using numerical analysis software. In this first method, simulation calculation is repeated for the circuit structure of FIG. 3 varying the parameters in a trial and error manner. When a good result is reached, the parameters in that case are used for creating the parameter map. Alternatively, the parameters values can be obtained by the second method in which evaluation tests are conducted on an actual apparatus to obtain the parameters.

The parameter selecting section 6 indicated in FIG. 1 is composed of a selection condition detecting section 61 that detects selection conditions for the parameter map, and a parameter selection processing section 62 that selects filter parameters F0, F1 and F2, and compensation parameters C0 and C1 referring to the parameter map stored in the parameter memory section 5 according to the selection condition detected by the selection condition detecting section 61.

The selection condition detecting section 61 has the construction shown in FIG. 5 and comprises: a battery voltage detecting circuit 61a that detects a battery voltage Vbat of the battery 7 to be supplied to the power switching circuit 45, a load resistance detecting circuit 61b that receives the battery voltage Vbat detected by the battery voltage detecting circuit 61a and a current detecting voltage Vs, which is a voltage across the shunt resistance Rs, and calculates a parasitic load resistance RL=Rs×(Vbat−Vs)/Vs, and a PWM frequency setting circuit 61c that sets a frequency fpwm of the PWM signal delivered from the PWM conversion circuit 44. The equation RL=Rs×(Vbat−Vs)/Vs mentioned above can be derived from the equality between the current flowing through the shunt resistance Rs, which is Vs/Rs and the current flowing through the parasitic load resistance RL, which is (Vbat−Vs)/RL. Concerning the inductive component Lc dIL/dt in the potential difference Vbat−Vs, it should be noted that the parasitic load resistance RL is measured with the power switch Q1 ON and the power switch Q2 OFF in the circuit of FIG. 5 after the current IL through the inductive load Lc has settled to a constant value, at which the voltage of Lc dIL/dt disappears. On the other hand, in actual operation of the inductive load Lc, the voltage Lc dIL/dt is much larger than the voltage RL×IL, hence solely Lc dIL/dt should be taken into consideration.

Now, the operation of the inductive load controlling device of the first embodiment is described in the following.

Referring to FIG. 3, explanation is first made on the parameter selection processing section 62 that sets filter parameters F0, F1 and F2 used by the target value filter 3 and compensation parameters C0 and C1 used by the PI compensator 43.

The parameter selection processing section 62 receives selection conditions from the selection condition detecting section 61. The battery voltage detecting circuit 61a in the selection condition detecting section 61 detects a battery voltage Vbat of the battery 7 indicated in FIG. 5. At the same time, the load resistance detecting circuit 61b calculates a parasitic load resistance RL=Rs×(Vbat−Vs)/Vs based on the values of: the battery voltage Vbat detected by the battery voltage detecting circuit 61a, the current detecting voltage Vs, which is the voltage across the shunt resistance Rs in FIG. 5, and the resistance value Rs of the shunt resistance Rs. Further, the PWM frequency setting circuit 61c sets the operation frequency fpwm of the PWM signal for the power switching circuit 45.

The parameter selection processing section 62 thus receives the battery voltage Vbat detected by the battery voltage detecting circuit 61a, the parasitic load resistance RL detected by the load resistance detecting circuit 61b, and the PWM frequency fpwm set by the PWM frequency setting circuit 61c.

The parameter selection processing section 62 selects filter parameters F0, F1 and F2 and compensation parameters C0 and C1 according to the received selection conditions of the battery voltage Vbat, the parasitic load resistance RL, and the PWM frequency fpwm, referring to the parameter memory section 5. When selection conditions are, for example, a PWM frequency fpwm of 50 Hz, a battery voltage Vbat of 10 V, and a parasitic load resistance RL of 4Ω, the corresponding parameters are, referring to the parameter map of FIG. 4, compensation parameters of C0=0.49 and C1=−0.19, and filter parameters of F0=0.28, F1=4.6, and F2=0.48.

The parameter selection processing section 62 provides the selected filter parameters F0, F1 and F2 to the target value filter 3 for use in operation of the formula (1) and the selected compensation parameters C0 and C1 to the PI compensator 43 for use in operation of the formula (2).

Thus, filter processing in the target value filter 3 and PI compensation processing in the PI compensator 43 can be performed corresponding to the operation status of the inductive load 2.

The parameter setting operation is executed at every predetermined interval so as to set the optimum parameters following the change in the operation status of the inductive load 2.

Figure 6A:
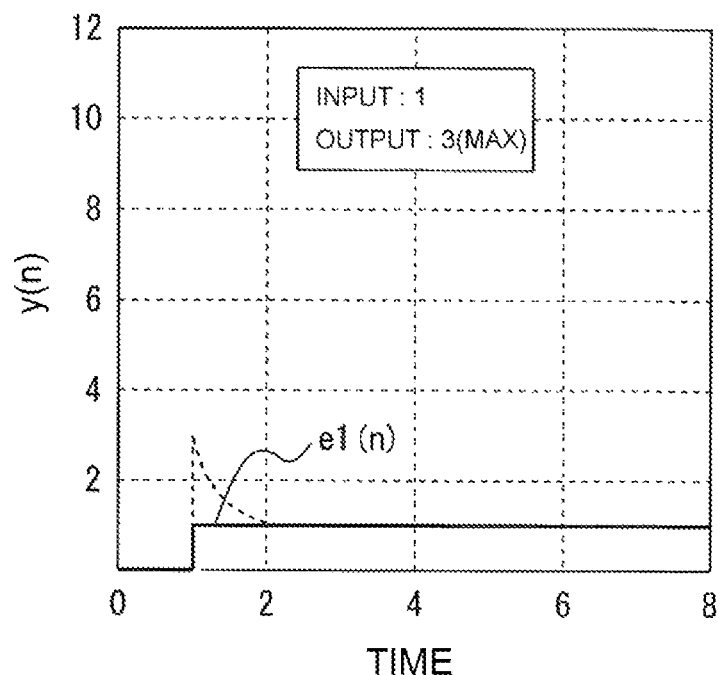
FIGS. 6A and 6B show filter output characteristics of a target value filter, in which FIG. 6A exhibits a response waveform for the case of small change in a current instruction value and FIG. 6B exhibits a response waveform for the case of large change in the current instruction value.
Figure 6B:
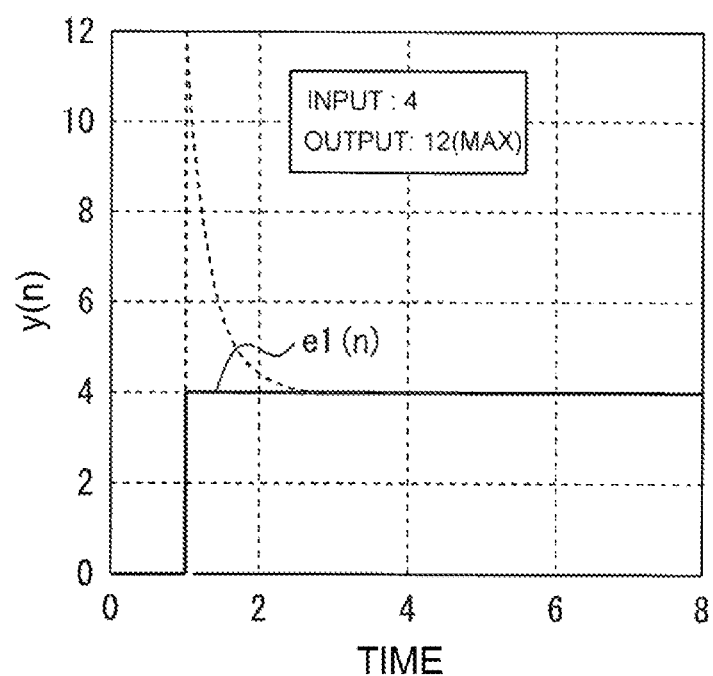

In the state of the target value filter 3 and the PI compensator 43 shown in FIG. 3 with the parameters set at the optimum values, a target current value $e1(n)$ with a step configuration as shown in FIGS. 6A, 6B and FIG. 7 is given from an external ECU to the target value filter 3, where a processing with a differential characteristic for example, high pass filter processing, is conducted.

In the target value filter 3, the multiplier 3c multiplies, by the filter parameter F1, the target value deviation that is the amount of change in the step input delivered from the subtractor 3a indicated in FIG. 2 and is the quantity of the target current value at present $e1(n)$ subtracted by the target current value $e1(n-1)$ at the previous sampling time. The filter parameter F1 is 4.6 and the largest in the filter parameters F0, F1 and F2.

As a result, when the change in the target value is small between the target current value $e1(n)$ at present and the target current value $e1(n-1)$ at the previous sampling time, the filter output $y(n)$ from the target value filter 3 is a differential waveform having a relatively small peak value as shown by the dotted line in FIG. 6A. When the change in the target value is large between the target current value $e1(n)$ at present and the target current value $e1(n-1)$ at the previous sampling time, the filter output is a differential waveform having a relatively large peak value as shown by the dotted line in FIG. 6B.

The filter output $y(n)$ delivered from the target value filter 3 is given to the inductive load controlling section 4, which in turn supplies electric current corresponding to the difference between the filter output $y(n)$ and the average current Im to the inductive load 2.

Specifically in the inductive load controlling section 4, the average current detecting circuit 41 detects the average current Im of the load current If flowing through the inductive load 2, and the subtractor 42 calculates the current deviation $e2(n)$ that is the difference between the average current Im and the filter output $y(n)$.

The current deviation $e2(n)$ is delivered to the PI compensator 43. As a result, the PI compensator 43 performs PI compensation operation processing according to the formula (2) based on the set parameters of C0=0.49 and C1=−0.19 to calculate a compensation output $d(n)$.

The compensation output $d(n)$ is delivered to the PWM conversion circuit 44 where a PWM signal is generated with a duty factor corresponding to the compensation output $d(n)$. The PWM signal is fed to the power switching circuit 45 to perform such PWM control that one of the P-channel field effect transistor Q1 and the N-channel field effect transistor Q2 is in the OFF state when the other is in the ON state. When the P-channel field effect transistor Q1 is in the ON state, electric current is supplied to the inductive load from the battery 7. Thus, the inductive load 2 is supplied by the battery 7 with current corresponding to the duty factor of the PWM signal.

The following describes average current response in the specific case shown in FIG. 7, in which selection conditions are: PWM frequency fpwm=300 Hz, parasitic load resistance RL=3.83Ω, and battery voltage Vbat=9 V. The target current value $e1(n)$ is given as shown by a thin dotted line in FIG. 7. At the time t1, the $e1(n)$ increases by a relatively small step; at the time t2, it increases also by a relatively small step; at the time t3, it increases by a relatively large step; at the time t4, it decreases by a relatively large step; and at the time t5 it decreases by a relatively small step.

In this example, at the time t1, the change in the target current value $e1(n)$ is small, so the filter output $y(n)$ from the target value filter 3 exhibits also a relatively small differential waveform as depicted with a thin solid line L1. The average current detected by the average current detecting circuit 41 increases slowly as shown by the thick solid line L2.

At the time t2, the change in the target current value $e1(n)$ is relatively small although larger than that at the time t1, so the filter output exhibits also relatively small differential waveform. The average current detected by the average current detecting circuit 41 rises relatively fast.

At the time t3, the target current value $e1(n)$ increases by a large step, so the filter output $y(n)$ from the target value filter 3 increases drastically as shown by the thin solid line L1. The average current detected by the average current detecting circuit 41 rises rapidly and reaches the target current value in a relatively short time without overshoot, as shown by the thick solid line L2. No ringing occurs thereafter.

At the time t4, the target current value $e1(n)$ decreases by a large step, so the filter output $y(n)$ from the target value filter 3 decreases drastically as shown by the thin solid line L1. The average current detected by the average current detecting circuit 41 falls rapidly and reaches the target current value in a relatively short time without undershoot, as shown by the thick solid line L2. No ringing occurs thereafter.

At the time t5, the target current value $e1(n)$ decreases by a small step, so the filter output $y(n)$ from the target value filter 3 exhibits relatively small differential waveform as shown by the thin solid line L1. The average current detected by the average current detecting circuit 41 decreases relatively slow as shown by the thick solid line L2.

Figure 8:
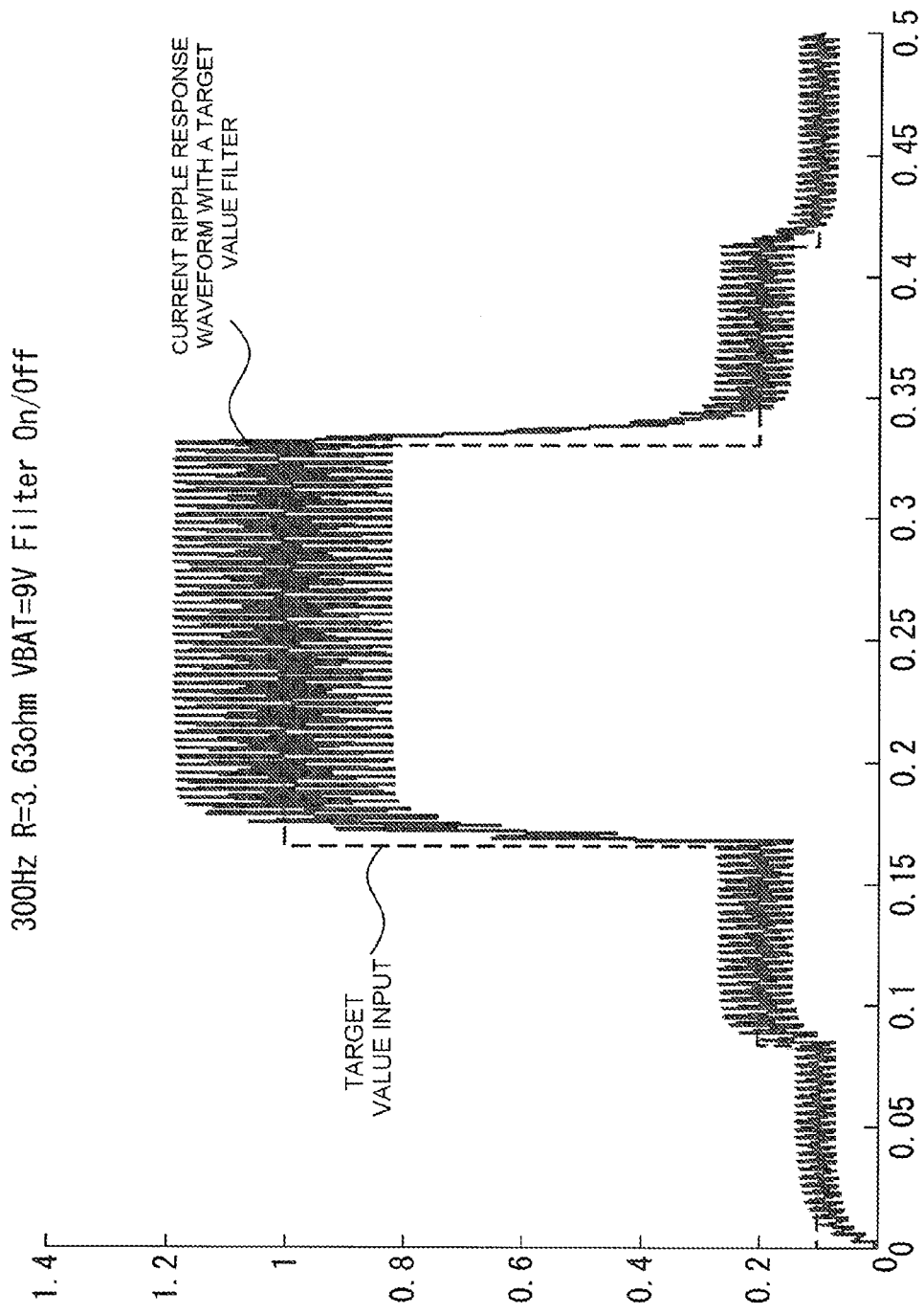
FIG. 8 shows a target current value and current ripple waveform in an inductive load when a target value filter is used.

FIG. 8 shows a current ripple response waveform of the current through the inductive load 2 in the case the target value filter 3 is provided. It is clear that the current ripple follows the target current value with good responsiveness.

When the target value filter 3 is eliminated, the average current rises up and falls down more slowly than in the case with the target value filter 3 as shown by the dotted line L3 in FIG. 7. Consequently, it takes a longer time to reach the target current value.

Therefore, the first embodiment described above that comprises a target value filter 3 exhibiting a differential characteristic meets the two requirements simultaneously. The two requirements are, as described previously, the requirement 1 that requires exclusion of overshoot, undershoot, and ringing, and the requirement 2 that requires quick response to reach the target current value in a short time.

The inductive load controlling device 1 of the first embodiment comprises the parameter memory section 5 and the parameter selecting section 6 composed of the selection condition detecting section 61 and the parameter selection processing section 62. As a result, the inductive load controlling device 1 itself can perform parameter setting operation for the target value filter 3 and the PI compensator 43. Therefore, the inductive load controlling device 1 installed in an automatic transmission simplifies parameter adjustment in the electronic control unit of the automatic transmission.

The inductive load controlling device installed in an automatic transmission shortens the time for optimization process of the control program in the electronic control unit and lightens the load for operational process of the electronic control unit.

In addition, compensation for the current deviation $e2(n)$ in the inductive load controlling section 4 is conducted by the PI compensator 43 that performs solely proportional and integral compensation. Consequently, excessive differential compensation is not conducted in addition to the differential characteristic of the target value filter 3, and thus stable compensation control is performed.

Now, an inductive load controlling device of a second embodiment according to the present invention is described in the following with reference to FIG. 9.

In the second embodiment, for the target value filter 3 and the PI compensator 43, rising up parameters and falling down parameters are defined separately corresponding to increasing and decreasing processes of the target current value.

Figure 9:
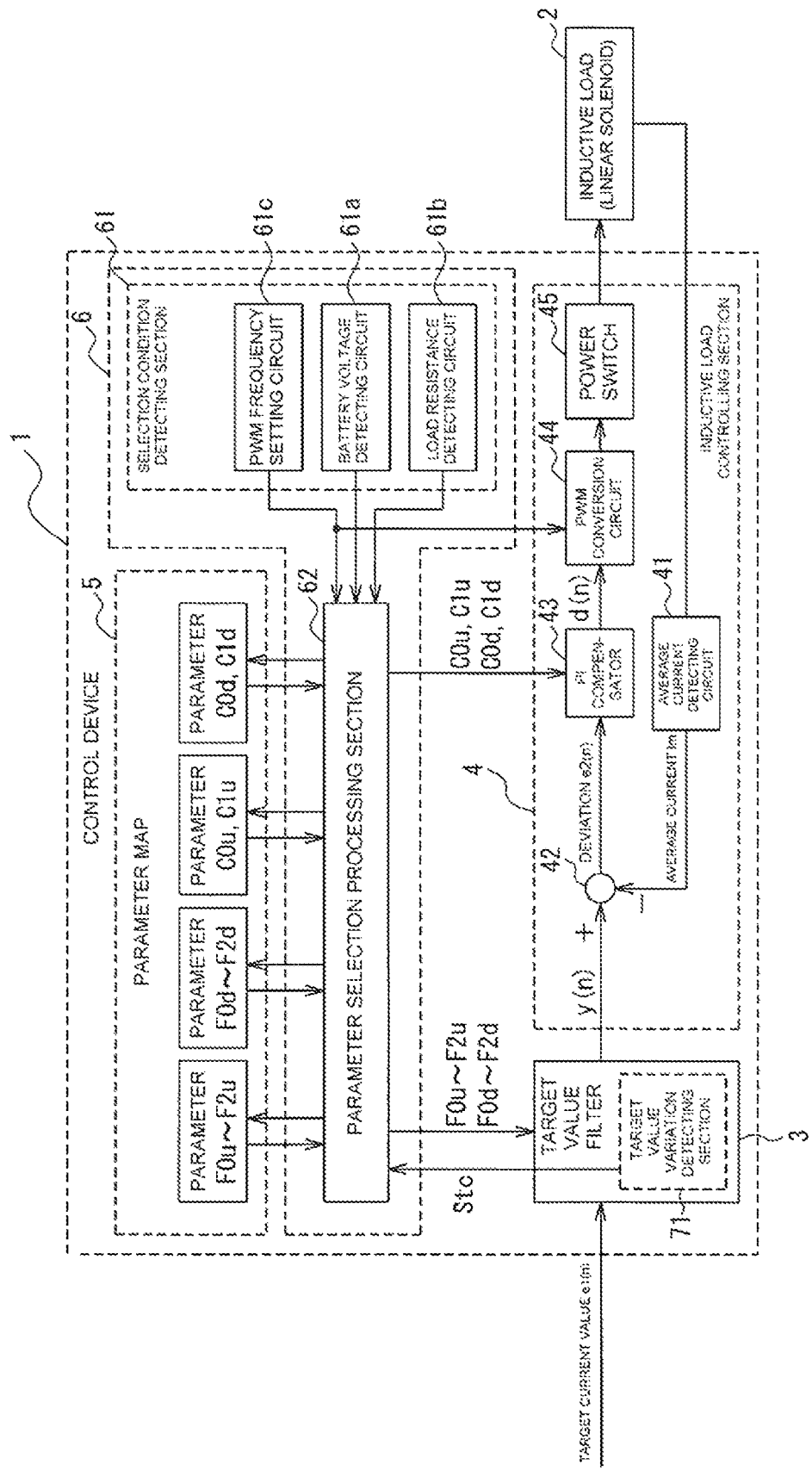
FIG. 9 is a block diagram of an inductive load controlling device of a second embodiment according to the invention.
Figure 10:
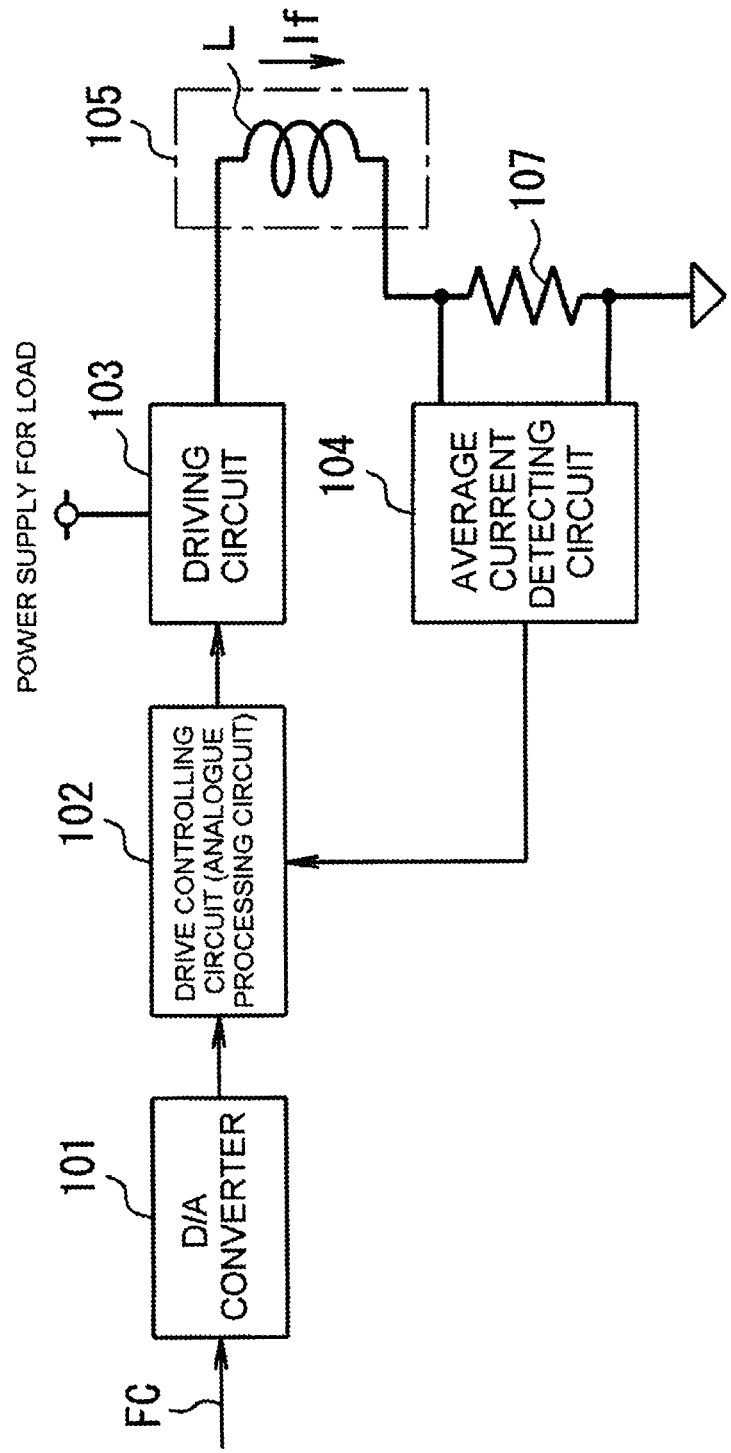
FIG. 10 is a block diagram of an example of schematic construction of a closed loop control system to which a conventional inductive load drive controlling device is applied.
Figure 11:
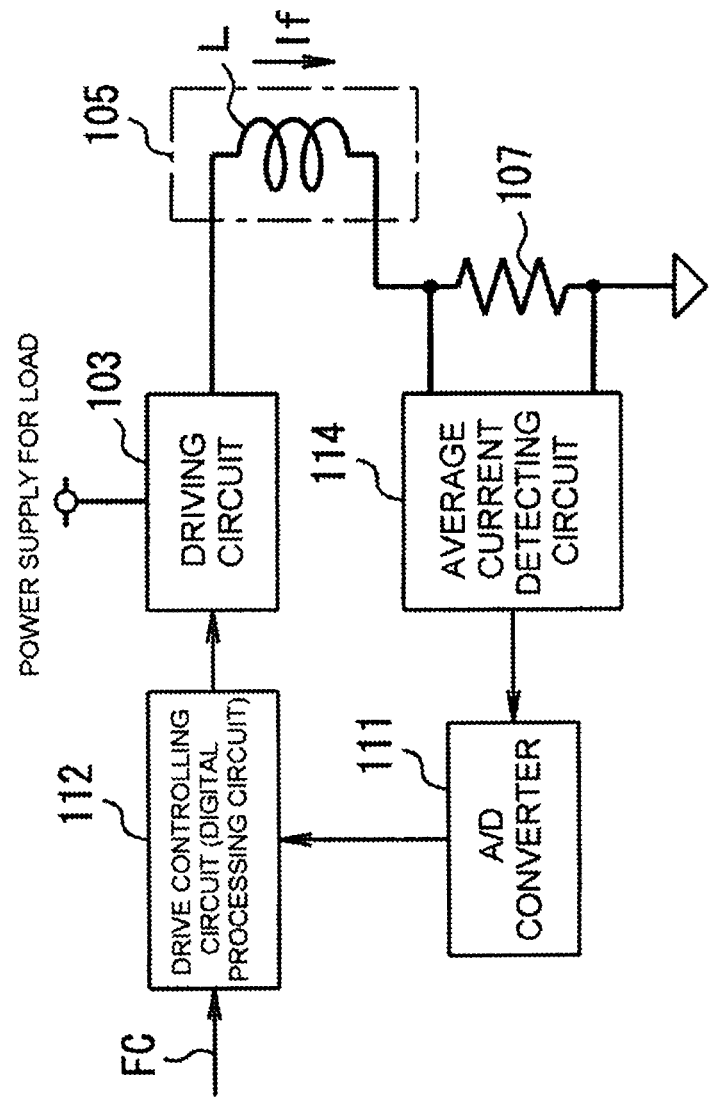
FIG. 11 is a block diagram of another example of schematic construction of a closed loop control system to which a conventional inductive load drive controlling device is applied.
Figure 12:
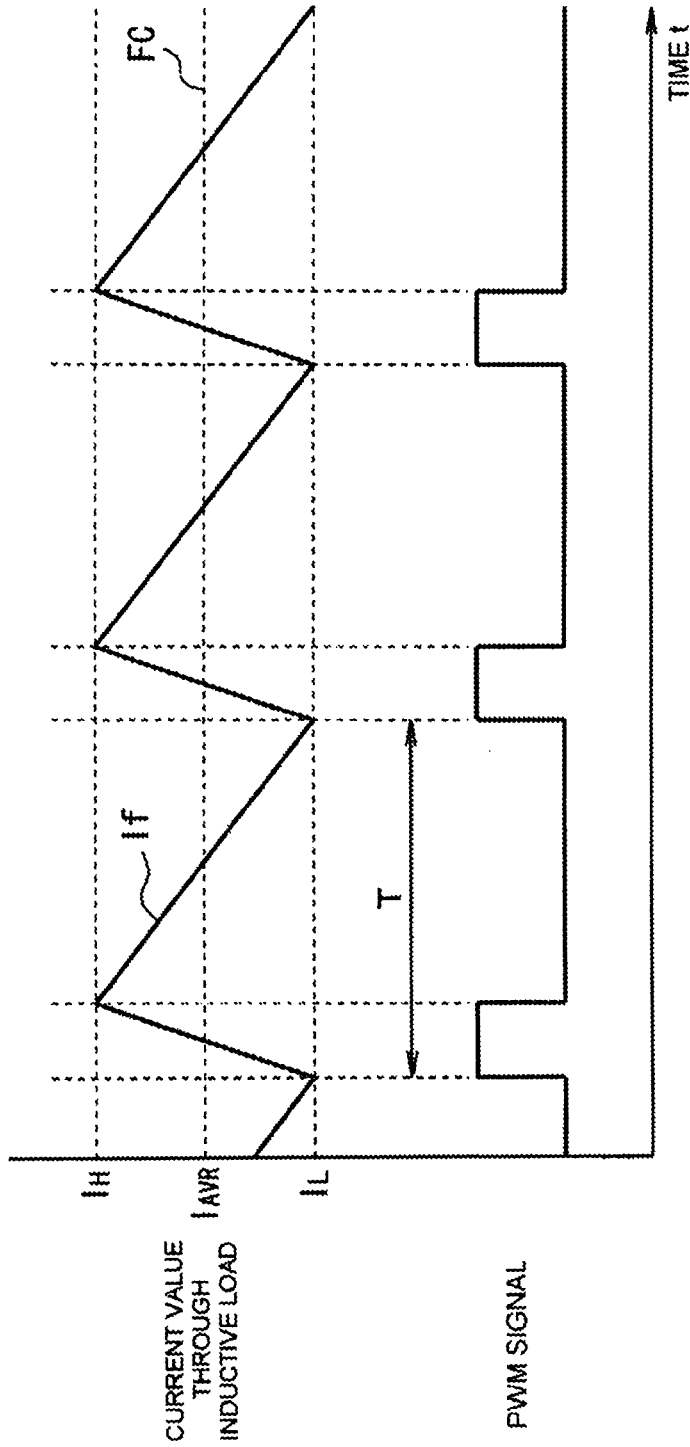
FIG. 12 is a timing chart showing current waveform in an inductive load under PWM control by a conventional inductive load drive controlling device.
Figure 13:
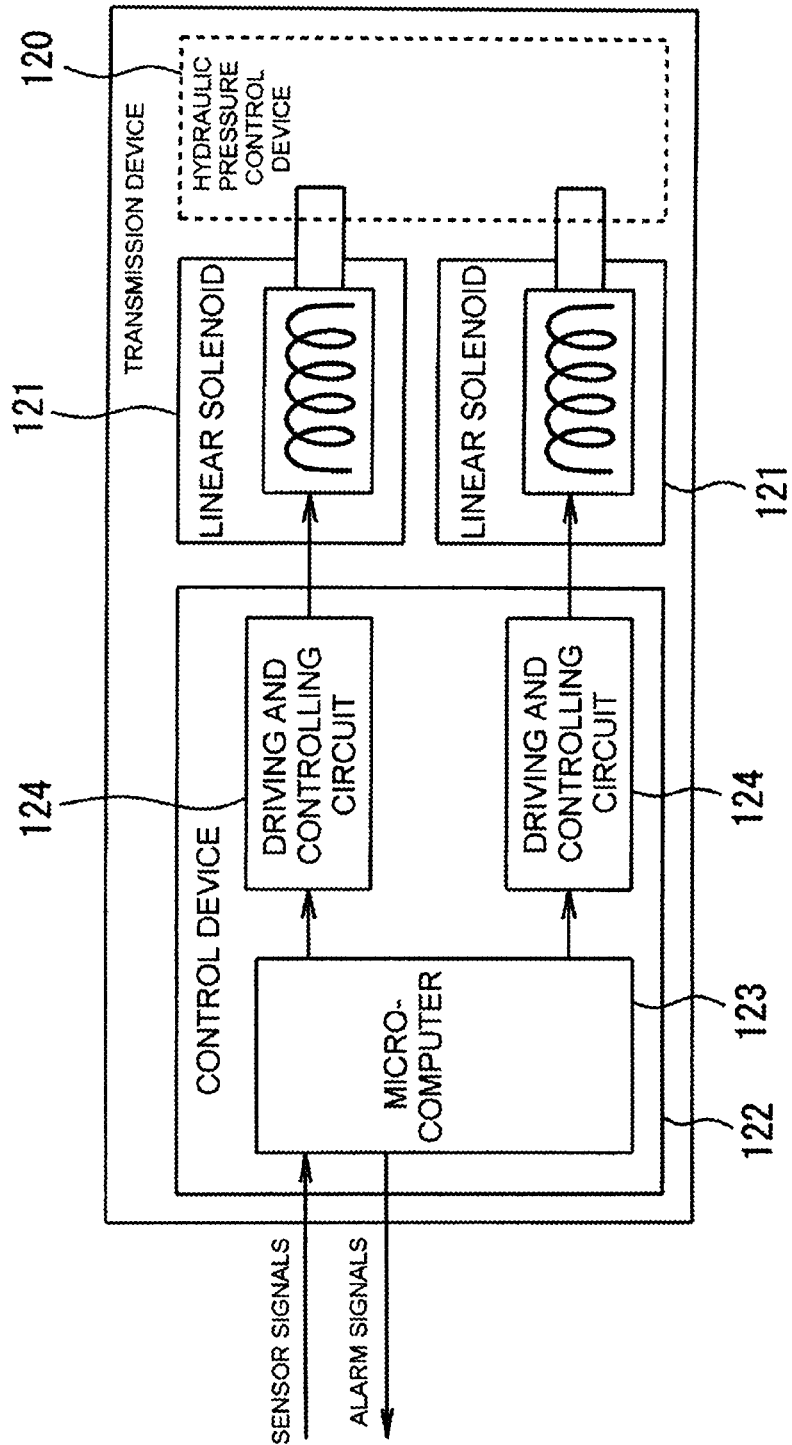
FIG. 13 is a block diagram of a conventional example of a transmission control device.

Thus, the parameter memory section 5 in the second embodiment stores, as shown in FIG. 9, rising up parameters $F0u$, $F1u$, $F2u$ and falling down parameters $F0d$, $F1d$, $F2d$ for the target value filter 3, and rising up parameters $C0u$, $C1u$ and falling down parameters $C0d$, $C1d$ for the PI compensator 43.

The target value filter 3 in the second embodiment is provided with a target value change detecting section 71 that detects change of the target current value $e1(n)$ and delivers a target value change signal Stc indicating the detected change to the parameter selection processing section 62. The parameter selection processing section 62 selects the rising up parameters $F0u$, $F1u$, $F2u$ and $C0u$, $C1u$, and supplies to the target value filter 3 and the PI compensator 43 when the target value has increased, and selects the falling down parameters $F0d$, $F1d$, $F2d$ and $C0d$, $C1d$, and supplies to the target value filter 3 and the PI compensator 43 when the target value has decreased.

The target value change detecting section 71 defines the decrease in the target current value $e1(n)$ when the sign of the target value change is negative that is a result of subtracting the target current value $e1(n-1)$ at the previous sampling time from the target current value $e1(n)$ at the present time, or an inequality $e1(n)-e1(n-1)<0$ holds. The increase in the target current value $e1(n)$ is defined if the sign of the target value change is positive that is a result of subtracting the target current value $e1(n-1)$ at the previous sampling time from the target current value $e1(n)$ at the present time, or an inequality $e1(n)-e1(n-1)>0$ holds. When the target current value is defined as the increase, then the target value change signal Stc is set to a logical value "1" for example, and when the target current value is defined as the decrease, then the target value change signal Stc is set to a logical value "0".

In the second embodiment, the rising up parameters and the falling down parameters are set for the target value filter 3 and the PI compensator 43 corresponding to the increase and decrease in the target current value $e1(n)$. As a consequence, the parameters can be set more finely corresponding to the increase and decrease of the target current value $e1(n)$, resulting in more appropriate parameter setting.

In the first and second embodiment described above, the parameters for both the target value filter 3 and the PI compensator 43 are changed according to the selection conditions. However, the parameter setting is not limited to this case, but the parameters for the PI compensator 43 can be fixed and solely the parameters for the target value filter 3 are changed. Moreover, every parameter is not necessarily changed according to the selection condition, but some of the parameters with a small magnitude such as F0, F2, and C1 can be fixed.

In the first and second embodiment described above, the PI compensation control is conducted in the inductive load controlling section 4. However, compensation control is not limited to the PI compensating control, but PID compensation control or PD compensation control with reduced differential compensation (D compensation) can be conducted.

In the description of the first and second embodiments, the inductive load controlling device 1 and the inductive load 2 are installed in a hydraulic control device of an automatic transmission. However, application of the inductive load controlling device of the invention is not limited to this case, but the inductive load controlling device can be installed in a hydraulic control device of other control apparatuses. Moreover, application of the inductive load controlling device is not limited to hydraulic control devices, but can range over any devices that control an inductive load.

It will be appreciated by those skilled in the art that the invention may be practiced otherwise than as expressly disclosed herein, and that substitutions and variations may be made without departing from the scope of the invention.

What is claimed is:

1. An inductive load controlling device for controlling an inductive load, the inductive load controlling device comprising:
    a target value filter that receives a target current value of electric current to be supplied to the inductive load, exhibits differential characteristics using a plurality of filter parameters, and outputs a filter output;
    an inductive load controlling section that controls load current to be supplied to the inductive load based on the filter output;
    a parameter memory section that stores the filter parameters, said filter parameters corresponding to a plurality of selection conditions;
    a selection condition detecting section that detects the selection conditions; and
    a parameter selection processing section that selects the filter parameters based on the selection conditions and delivers the filter parameters to the target value filter.

2. The inductive load controlling device according to claim 1, wherein
    the target value filter delivers a filter output y(n) represented by a formula:

$$y(n)=F0\times y(n-1)+F1\times (e1(n)-e1(n-1))+F2\times e1(n)$$

where $e1(n)$ is a received target current value, $e1(n-1)$ is a target current value at a previous sampling time, $y(n-1)$ is a filter output value at the previous time, and F0, F1, and F2 are the filter parameters.

3. The inductive load controlling device according to claim 1, wherein
    the inductive load controlling device further comprises a target value change detecting section that detects change of the target current value;
    the parameter memory section stores the filter parameters by separating the filter parameters into rising up parameters for rising up of the target current value and falling down parameters for falling down of the target current value; and the parameter selection processing section selects the falling down parameters when the target value change detecting section detects a decrease of the target current value and selects the rising up parameters when the target value change detecting section detects an increase of the target current value.

4. The inductive load controlling device according to claim 3, wherein
the target value change detecting section defines the decrease of the target current value as being when a sign of a result of subtracting a previous target current value e1(n−1) from the received target current value e1($n$) is negative, and defines the increase of a target current value as being when the sign of the result of subtracting the previous target current value e1(n−1) from the received target current value e1($n$) is positive.

5. The inductive load controlling device according to claim 1, wherein the selection conditions include at least one of a frequency of a modulating signal, a battery voltage, and a parasitic load resistance of the inductive load.

6. An inductive load controlling device for controlling an inductive load, the inductive load controlling device comprising:
a target value filter that receives a target current value of electric current to be supplied to the inductive load, exhibits differential characteristics using a plurality of filter parameters, and outputs a filter output;
an inductive load controlling section that includes a current detecting section that detects load current flowing in the inductive load and a PI (Proportional Integral) compensator that performs compensation processing using a plurality of compensation parameters to compensate a deviation of the load current from the filter output, and controls load current to be supplied to the inductive load;
a parameter memory section that stores the filter parameters and the compensation parameters, the filter parameters and compensation parameters corresponding to a plurality of selection conditions;
a selection condition detecting section that detects the selection conditions; and
a parameter selection processing section that selects the filter parameters and the compensation parameters based on the selection conditions and delivers the filter parameters and the compensation parameters to the target value filter and the PI compensator.

7. The inductive load controlling device according to claim 6, wherein
the target value filter delivers a filter output y(n) represented by a formula:

$$y(n)=F0 \times y(n-1)+F1 \times (e1(n)-e1(n-1))+F2 \times e1(n)$$

where e1($n$) is a received target current value, e1(n−1) is a target current value at a previous sampling time, y(n−1) is a filter output value at the previous time, and F0, F1, and F2 are the filter parameters.

8. The inductive load controlling device according to claim 6, wherein
the PI compensator delivers a compensation output d(n) represented by a formula:

$$d(n)=C0 \times e2(n)+C1 \times e2(n-1)+d(n-1)$$

where e2($n$) is a received deviation, e2(n−1) is a deviation at a previous sampling time, d(n−1) is a compensation output at the previous time, and C0 and C1 are compensation parameters.

9. The inductive load controlling device according to claim 6, wherein the inductive load controlling device further comprises a target value change detecting section that detects change of the target current value;
the parameter memory section stores the filter parameters by separating the filter parameters into rising up parameters for rising up of the target current value and falling down parameters for falling down of the target current value; and
the parameter selection processing section selects the falling down parameters when the target value change detecting section detects a decrease of the target current value and selects the rising up parameters when the target value change detecting section detects an increase of the target current value.

10. The inductive load controlling device according to claim 9, wherein
the target value change detecting section defines the decrease of the target current value as being when a sign of a result of subtracting a previous target current value e1(n−1) from the received target current value e1($n$) is negative, and defines the increase of a target current value as being when the sign of the result of subtracting the previous target current value e1(n−1) from the received target current value e1($n$) is positive.

11. The inductive load controlling device according to claim 6, wherein the selection conditions include at least one of a frequency of a modulating signal, a battery voltage, and a parasitic load resistance of the inductive load.

12. A method for controlling an inductive load, the method comprising the steps of:
receiving in a target value filter a target current value of electric current to be supplied to the inductive load;
detecting a load current flowing in the inductive load;
storing filter parameters corresponding to a plurality of selection conditions;
detecting values of the selection conditions;
selecting the filter parameters corresponding to the detected values;
delivering the filter parameters to the target value filter;
outputting from the filter a filter output based upon differential characteristics using the filter parameters; and
controlling the load current to be supplied to the inductive load based on the filter output.

13. The method according to claim 12, wherein
the filter output y(n) is represented by a formula:

$$y(n)=F0 \times y(n-1)+F1 \times (e1(n)-e1(n-1))+F2 \times e1(n)$$

where e1($n$) is a received target current value, e1(n−1) is a target current value at a previous sampling time, y(n−1) is a filter output value at the previous time, and F0, F1, and F2 are the filter parameters.

14. The method according to claim 12, further comprising performing PI (Proportional Integral) compensation processing using a plurality of compensation parameters to compensate a deviation of the load current from the filter output, by performing the following steps:
storing compensation parameters corresponding to the plurality of selection conditions;
selecting compensation parameters corresponding to the detected values; and
delivering the compensation parameters to a PI compensator; and
delivering a compensation output d(n) from the PI compensator represented by a formula:

$$d(n)=C0 \times e2(n)+C1 \times e2(n-1)+d(n-1)$$

where $e2(n)$ is a received deviation, $e2(n-1)$ is a deviation at a previous sampling time, $d(n-1)$ is a compensation output at the previous time, and $C0$ and $C1$ are compensation parameters.

15. The method according to claim 12, further comprising the steps of:

detecting change of the target current value;

storing the filter parameters by separating the filter parameters into rising up parameters for increasing the target current value and falling down parameters for reducing the target current value; and selecting the falling down parameters when a decrease of the target current value is detected and selecting the rising up parameters when an increase of the target current value is detected.

16. The method according to claim 15, wherein the decrease of the target current value is defined as being when a sign of a result of subtracting a previous target current value $e1(n-1)$ from the received target current value $e1(n)$ is negative, and the increase of a target current value is defined as being when the sign of the result of subtracting the previous target current value $e1(n-1)$ from the received target current value $e1(n)$ is positive.

17. The method according to claim 12, wherein the selection conditions include at least one of a frequency of a modulating signal, a battery voltage, and a parasitic load resistance of the inductive load.

* * * * *